(12) United States Patent
Achkir et al.

(10) Patent No.: US 11,120,119 B2
(45) Date of Patent: Sep. 14, 2021

(54) RECORDING OF INTRINSIC DEVICE SIGNATURES IN BLOCK CHAIN FOR COUNTERFEIT PREVENTION

(71) Applicant: Cisco Technology, Inc., San Jose, CA (US)

(72) Inventors: D. Brice Achkir, Livermore, CA (US); Ramanathan Jagadeesan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 15/946,830

(22) Filed: Apr. 6, 2018

(65) Prior Publication Data

US 2019/0311108 A1 Oct. 10, 2019

(51) Int. Cl.
*G06F 21/44* (2013.01)
*H04L 9/06* (2006.01)
*G06F 16/951* (2019.01)
*G06F 16/955* (2019.01)
*G06F 21/57* (2013.01)
*G06F 21/64* (2013.01)
*H04L 29/06* (2006.01)
*G06F 21/10* (2013.01)

(52) U.S. Cl.
CPC ............ *G06F 21/44* (2013.01); *G06F 16/951* (2019.01); *G06F 16/955* (2019.01); *G06F 21/57* (2013.01); *H04L 9/0637* (2013.01); *G06F 21/10* (2013.01); *G06F 21/445* (2013.01); *G06F 21/64* (2013.01); *H04L 63/12* (2013.01)

(58) Field of Classification Search
CPC .......... G06F 21/44; G06F 21/64; G06F 21/73; G06F 21/74; G06F 21/75; G06F 21/76; G06F 21/70; G06F 21/57; H04L 63/00; H04L 63/3239; H04L 63/06; H04L 9/0637; H04L 9/32; H04L 9/3226; H04L 63/0876; H04L 63/12; H04L 63/14; H04L 2209/38

See application file for complete search history.

(56) References Cited

U.S. PATENT DOCUMENTS

| | | | |
|---|---|---|---|
| 9,813,395 B2 | 11/2017 | Sadhasivan et al. | |
| 9,823,303 B1* | 11/2017 | Ooi | G01R 31/31718 |
| 9,849,364 B2 | 12/2017 | Tran et al. | |
| 10,312,936 B2* | 6/2019 | Waters | H04L 1/0041 |

(Continued)

FOREIGN PATENT DOCUMENTS

EP 2 770 663 A1 8/2014

OTHER PUBLICATIONS

Crosby et al., "BlockChain Technology: Beyond Bitcoin," Sutardja Center for Entrepreneurship & Technology, UK Berkeley, Oct. 16, 2015, pp. 1-35.

*Primary Examiner* — Kristine L Kincaid
*Assistant Examiner* — Shaqueal D Wade
(74) *Attorney, Agent, or Firm* — Polsinelli (57) ABSTRACT

Systems, methods, and devices are disclosed for authenticating a product. An internal component of a product is identified by identifying an intrinsic attribute of the internal component, where the intrinsic attribute is received at a time subsequent to independently storing the intrinsic attribute in a database. A match is determined between the intrinsic attribute and the stored intrinsic attribute. The product is confirmed to be authentic when the match is verified.

19 Claims, 5 Drawing Sheets

(56) References Cited

U.S. PATENT DOCUMENTS

| | | | |
|---|---|---|---|
| 2007/0038866 A1* | 2/2007 | Bardsley | H04L 63/0272 |
| | | | 713/182 |
| 2007/0194945 A1 | 8/2007 | Atkinson | |
| 2016/0047855 A1* | 2/2016 | Bhunia | G01R 31/31858 |
| | | | 324/763.01 |
| 2016/0282394 A1* | 9/2016 | House | G06K 9/00577 |
| 2018/0205731 A1* | 7/2018 | Mikolasch | H04M 3/305 |
| 2018/0211213 A1* | 7/2018 | Vivier | G06Q 10/0832 |
| 2018/0248873 A1* | 8/2018 | Loreskar | H04L 41/0893 |
| 2019/0342085 A1* | 11/2019 | Kube | H04L 9/3247 |

* cited by examiner

RECORDING OF INTRINSIC DEVICE SIGNATURES IN BLOCK CHAIN FOR COUNTERFEIT PREVENTION

TECHNICAL FIELD

The present disclosure relates generally to authenticating a product, and more specifically to the detection, prevention and illumination of counterfeit products.

BACKGROUND

Some product registration systems are used to verify whether a product is an originally shipped, genuine product or a counterfeited product. Systems that track and verify genuine products have proven to be important since it is estimated that, in many cases, millions of revenue can be lost from the competing sales of counterfeited products selling on non-authorized sites (such as eBay, Amazon, etc.) for more than 30-80% off the original list price.

However, such registration systems are only as good as the data recorded, and current systems are not adequate for detecting a number of counterfeited products. Genuine products, for example, can have components encompassed within an outer casing. The casing, which can include identifying product information on, for example, a label (e.g., barcode, holographic picture, nano text, etc.), can be used to identify the product as an original. But someone wishing to counterfeit that product needs only the original casing to disguise a product as an original. For example, the casing can be removed from the original product and then placed on a counterfeited product made up of lower quality components. From the outside, this seems like a genuine product, and current registration systems would be unable to distinguish between the original and the tampered versions of the product. Accordingly, registration systems that are based on data read from the outside label, or from one component, are inadequate for detecting many counterfeited products and a more accurate system is needed.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, and devices are disclosed for authenticating a product by identifying an internal component of the product. The internal component of the product is identified based on an intrinsic attribute of the internal component, which is received at a time subsequent to independently storing the intrinsic attribute in a database. A match is determined between the intrinsic attribute and the stored intrinsic attribute. When the match is verified, the product is confirmed to be authentic.

In alternative embodiments, a system receives data associated with a first intrinsic attribute of an internal component of the product and a product identifier associated with the casing for the product. The first intrinsic attribute and the product identifier may be stored within a blockchain on a node. In some embodiments, the system may also receive a second intrinsic attribute of the component. Based on receiving the product identifier and the second intrinsic attribute from the computing device, the product identifier is verified to be associated with the first intrinsic attribute on the blockchain, and the first intrinsic attribute is compared to the second intrinsic attribute. The product is authenticated when there is a match.

Example Embodiments

The disclosed technology addresses the need in the art for detecting counterfeit products. Measured intrinsic and/or operational attributes of a product can act as a unique signature of that product, enabling the detection of counterfeit products and preventing duplication of parts inside the product's casing. From the unique signatures of the internal components of the product, which are accessible by entities in a supply chain (e.g., a secured private blockchain), manufacturers can ensure that the internal component and the external component are appropriately matched together in an authentic completed product. Moreover, the accuracy of the transaction history on the blockchain can be verified. Since the signature of the product is correlated with both the internal component and the external component, any change within the product will impact the signature associated with the product on the blockchain. Previously available product authentication systems do not employ abilities to track products beyond the information contained on the label.

Although the product can be any product with detectable attributes for an internal component, the example product of a pluggable transceiver is discussed throughout the subject application to highlight aspects of the technology. The internal components of the pluggable transceiver, for example, can include any number of product parts, such as one or more transceivers and an integrated circuit. The external component can be the pluggable transceiver's outside casing. The outside casing, for example, can be a housing that includes a label with one or more of a barcode, holographic picture, nano text, etc. that identifies it as a pluggable transceiver from a certain manufacturer or designer. While the outside casing may or may not be designed to be removable after being put on the transceiver/internal components, a counterfeiting entity may nevertheless be able to acquire genuine outside casings or counterfeit outside casings with genuine part identifiers. Thus, without the disclosed technology, from the outside it seems as if the pluggable transceiver is a genuine product if the casing is placed over counterfeited transceivers.

The pluggable transceiver can accordingly be authenticated by the disclosed technology as genuine by an authentication service receiving, from transceivers within the pluggable transceiver, data regarding intrinsic attributes of one or more internal components that are separate from and encompassed by the outside casing of the pluggable transceiver. The intrinsic attributes can be stored within a blockchain, and in some embodiments, the blockchain can be copied and distributed among trusted nodes on the system. Additionally, in some embodiments a product identifier that is assigned to the casing of the pluggable transceiver can also be stored within the blockchain, such that the specific casing is matched to the specific internal components.

Once a customer purchases the product, if the product has the right intrinsic attributes, the product can be authenticated as genuine. In some embodiments, if there is not a match, the product is disabled (e.g., by disabling the port of the router the product is plugged into).

In some embodiments, a network device, such as a switch, router, firewall, etc. can measure and/or determine the intrinsic attributes of the product when the product is plugged into a port of the switch and/or router. This can be an automatic process, such that the mere act of plugging the product into the port initiates the authentication process. In other embodiments, however, the authentication process can be initiated by a user's request to authenticate through some computing device, such as through an application on a mobile device, an online portal on a Desktop or laptop, etc. In still other embodiments, any device that can scan and/or communicate with the product can initiate the authentication process, such as a scanner device operated by a distributor or manufacturer, thereby ensuring that the product is authenticated throughout its supply chain.

For example, in those embodiments for which an application is used, the product identifier can be read by an application installed on a customer's mobile phone, laptop or desktop. In some embodiments, the customer can also receive a private key at purchase, which can be requested by the system for verification of the product. If the private key received from the customer matches the private key associated with the product identifier, and the product has the right intrinsic attributes, the product is authenticated as genuine. If there is not a match, the product is disabled.

Figure 1:
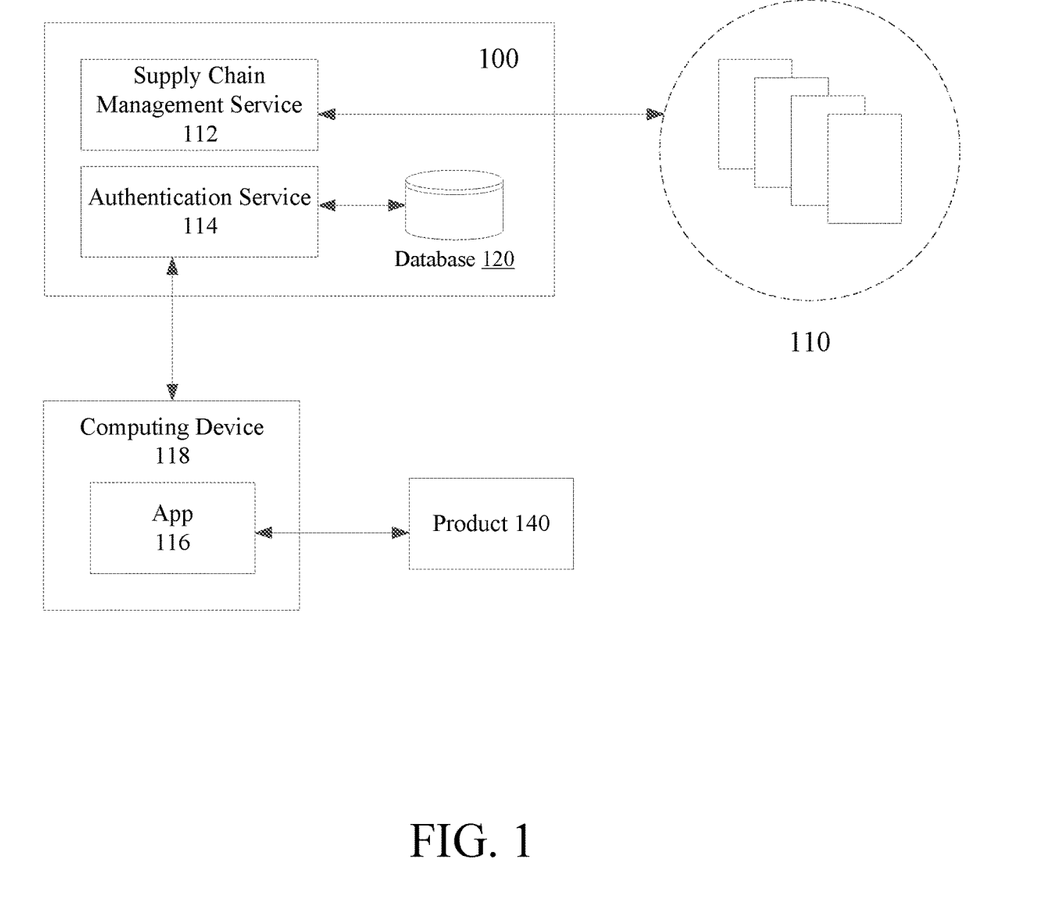
FIG. 1 shows an example schematic diagram of a blockchain environment that includes various nodes that are configured to maintain a blockchain in accordance with some embodiments.

FIG. 1 shows an example schematic diagram of a blockchain environment that includes various nodes that are configured to maintain the blockchain in accordance with some embodiments. Supply chain management service 112 in system 100 is communicatively coupled to various network nodes 110. Network nodes 110 are configured to maintain a blockchain in coordination with each other through a network connection, such as a wide area network (WAN), local area network (LAN), wireless local area network (WLAN), etc. Network nodes 110 can include any number of suppliers, manufacturers, and/or distributors that are part of a chain of custody for a product, including the completed product and parts making up the product.

In some embodiments, authentication service 114 can communicate with application 116 that is installed and/or executing on computing device 118, which can be a router, switch, mobile device, scanning device, laptop, Desktop, etc. Computing device 118 can obtain data from product 140, such as data regarding an intrinsic attribute measurable from the functioning of the product's internal components. For example, one or more transceivers can transmit measurements associated with the functioning of the pluggable transceiver to authentication service 114 or application 116 (which receives from product 140 and then transmits the measurements to authentication service 114). The data can be measurements including, but not limited to, power (consumed and/or remaining), current, voltage, etc. One or more intrinsic attributes can be defined and/or determined based on the measured data.

Distributed database 120 stores the intrinsic attributes in a linked ledger system. In the embodiment shown, database 120 is a secured private blockchain, where a continuously growling list of records, called blocks, are linked to one or more previous blocks. Blocks can be continuously updated as the blockchain is modified with subsequent transactions, data, updates, etc. For example, a block can record that transceivers have been manufactured, a later block can record that a casing has been manufactured, and another subsequent block can record that the transceiver has been matched to the casing. This record can extend throughout the entire manufacturing and distribution of the associated product, including receipt of materials (e.g., receiving, from an entity, the wiring, transceiver parts, laser, etc.) to the end purchase (e.g., information that the pluggable receiver was purchased from a distributor or retailer, and by whom).

In the embodiment shown, the secured private blockchain can be used and run by one organization or entity, which can manage security and control authorization for each node on the network in addition to managing business rules and policies. For example, the organization may grant a first node access to only a portion of some data on the blockchain, so that information from another node (who may be a competitor of the first node) is kept private from the first node. The organization may even keep some information private from all network nodes 110. Alternatively, in some embodiments database 120 may be, in part or in whole, a public distributed blockchain. However, one of skill in the art will understand that any architecture that supports a chain of custody of individual components can be used to the same effect.

Figure 2:
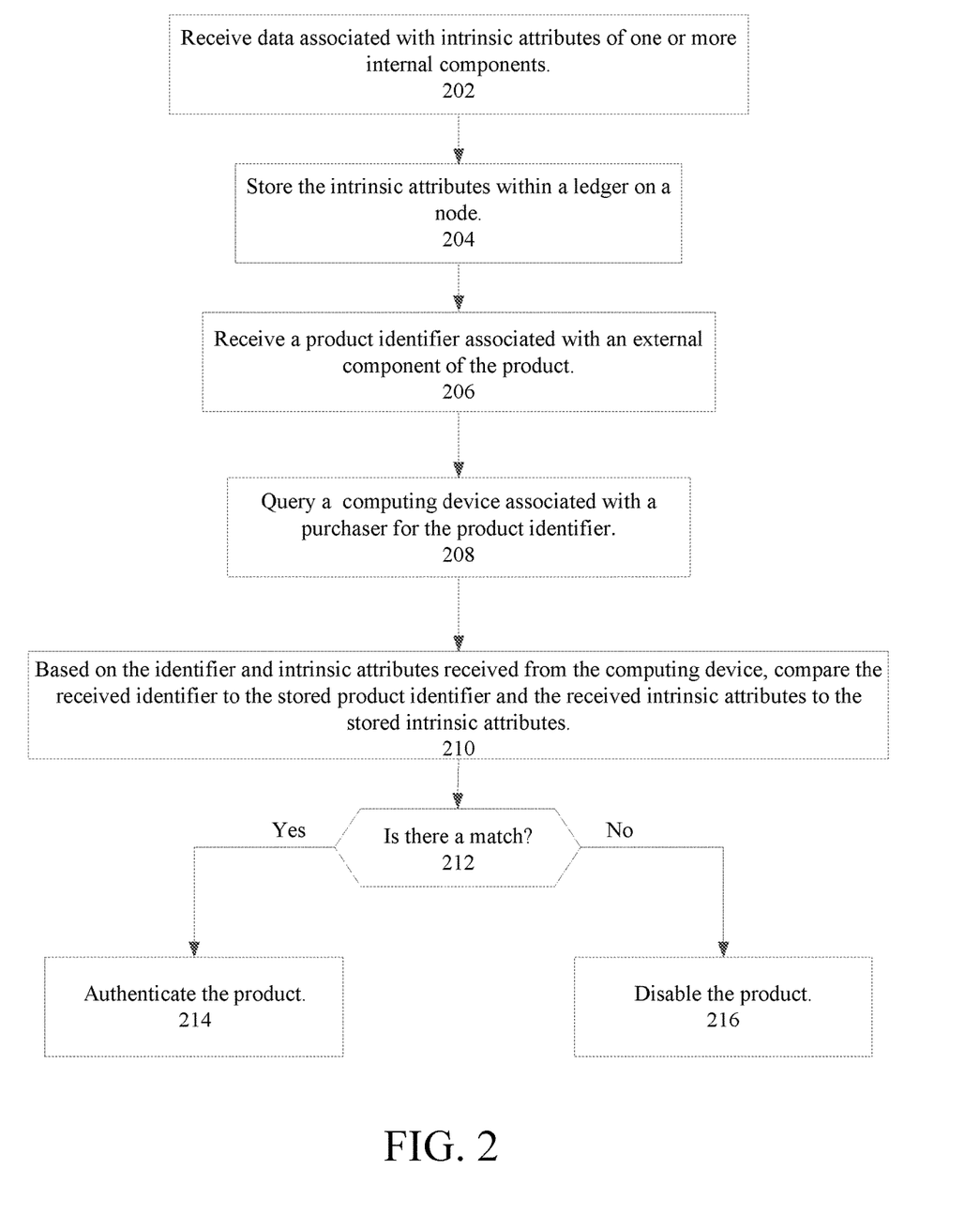
FIG. 2 is a flowchart representation of authenticating a product in a blockchain environment in accordance with some embodiments.

FIG. 2 is a flowchart representation showing the authentication of a product in a blockchain environment in accordance with some embodiments. The method begins by receiving data associated with the intrinsic attributes of one or more internal components of the pluggable transceiver (step 202). For example, the data can be received from a transceiver, and can be measurements from optical monitoring of the transmitted power, received power, extinction ratio (sequence of historical power performance stored over a period of time in database 142), the power consumed, and/or associated currents and voltages. The extinction ratio, which is the ratio of two optical power levels of a digital signal generated by an optical source (e.g., laser diode), can be affected by things such as the silicon properties of the components, the laser, driver, the tuning of the transceiver, design implementation, etc. The data itself and/or attributes derived from the data can be stored within a blockchain on node 110 as intrinsic attributes (step 204).

Figure 3:
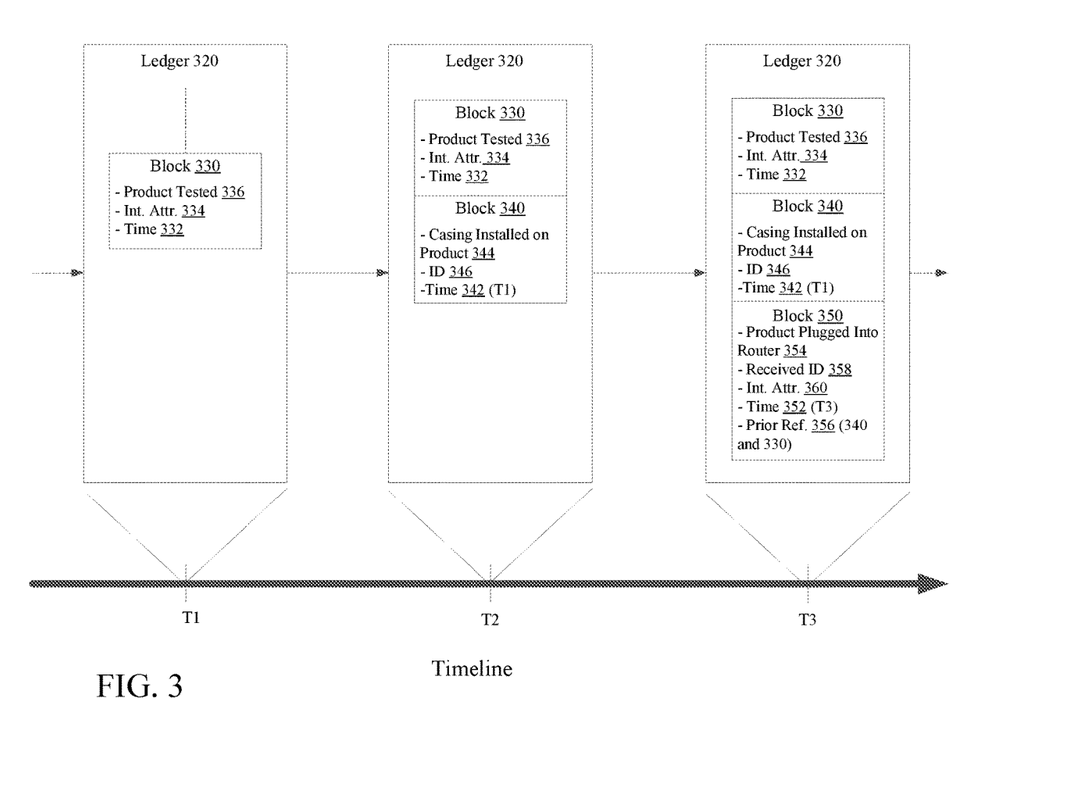
FIG. 3 shows a block diagram of an example implementation of a blockchain in accordance with some embodiments.

Turning momentarily to FIG. 3, an example block diagram of a blockchain (e.g., blockchain 320) according to various embodiments is shown. This example embodiment illustrates blockchain 320 at times T1, T2, and T3, which are separated by time intervals controlled by system 100. For example, blockchain 320 includes a first block (block 330) at time T1, with block 340 appended to blockchain 320 at T2, and block 350 appended to blockchain 320 at T3.

Each block can be appended at any time there is a step or event in the pluggable transceiver's manufacturing, processing, and/or distribution timeline. Each block can also contain multiple transactions from multiple clients and.or applications. For example, once or after the internal components of the pluggable transceiver have been manufactured, the internal components can be tested in order to measure the intrinsic attributes that will provide its unique signature. This can be done before the casing is put on to the product. Block 330, for example, includes information that the internal components of the pluggable receiver has been tested ("Product Tested" 336) at block timestamp 332. Block timestamp 332 can indicate when block 330 was added (e.g., T1), when the product was tested, or both.

In the blockchain, each block other than the first block contains a reference to one or more prior blocks (e.g., is a blockchain). For example, block 340 can contain a reference to a prior block associated with receiving materials for manufacturing the casing and/or can reference block 330; block 350 can contain a prior reference 354 to both block 340 and block 330, such that the pluggable transceiver associated with block 350 can be matched to its intrinsic attributes, ID, and/or casing; and so on.

The intrinsic attributes stored on the blockchain can be derived from data specific to the internal components (e.g., data that provides a signature of the pluggable receiver). Intrinsic attributes derived from optical monitoring can be set up so that, at any given time, the power being sent by the pluggable transceiver and the power being received by the pluggable transceiver is known using built in measurement features. Since the intrinsic attributes (e.g., the power consumed, current and voltage once the transceiver is plugged in, optical power, etc.) are specific to the individual product itself (other transceivers of the same type will display different intrinsic attributes), the individual product can be tracked without having to rely on information printed on the casing.

Block 340 is created during case installation, and shows information that the casing was installed ("Casing Installed on Product" 344) at block timestamp 342 (e.g., T2) (however, in some embodiments block 340 can occur before block 330). Block 340 also includes a product identifier associated with the casing, such as an ID read from a label, barcode, holographic picture, nano text, etc. ("ID" 346). ID 346 can be a product identifier received by scanning the label on the casing, such as with an application executing on a computing device (step 206).

Although not shown, various blocks may be appended throughout the blockchain. For example, a separate block can reference the creation of the casing (say, before block 340). Another block can reference the purchase of the pluggable transceiver. Blocks can be appended for any transactional or custodial event where information is recorded.

Block 350, which can be appended at block timestamp 352 (e.g., T3) after the pluggable transceiver is plugged into a router, identifies that the pluggable transceiver has been plugged into the router and needs to be verified as an authentic product ("Product Plugged Into Router" 354). Computing device 118 can send, or system 100 can receive from computing device 118, the product identifier (step 208) for verification.

For example, an administrator operating the computing device can initiate registering the product and configuring the activation of a port on a network device (e.g., switch/router). In some embodiments, the computing device can be the network device (e.g., switch or router) itself, and can automatically initiate capturing the intrinsic attributes of the product (intrinsic attributes 360) for comparison with the stored intrinsic attributes (intrinsic attributes 334) on database 120.

Additionally and/or alternatively, computing device 118 can identify the product identifier (ID 358) from the outside label by, for example, opening an application on the computing device and scanning a label on the pluggable transceiver's casing. Computing device 118 can identify or receive input from a user about the switch and which port the pluggable transceiver is plugged into. Computing device 118 can also communicate with authentication service 114 in order to access the stored intrinsic attributes associated with the product identifier. Thus, ID 358 and/or intrinsic attributes 360 can be compared with what is stored in the blockchain to determine if the pluggable transceiver is authentic step (210) (e.g., can be compared to the information in blocks 330 and 340).

If a match is found between the stored and received product IDs (e.g., ID 346 in block 340 and received ID 358 in block 350) and/or between the stored and received intrinsic attributes (e.g., intrinsic attributes 334 in block 330 and received intrinsic attributes 360 in block 350), the pluggable transceiver can be authenticated as a genuine, non-counterfeit product (step 214). However, if a match is not found, the pluggable device can be flagged as a counterfeit product and/or otherwise disabled (step 216). For example, the operating system of the network device including the port to which the transceiver is installed can activate the port the product is plugged into after authentication (for a match) or deactivated (if no match is found), such as service 114 telling the switch to kill the port. Once validated, system 100 can record authentication and registration in the blockchain.

Checking that there is a match between the product ID and intrinsic attributes is extremely secure, since cross correlating one or more unique intrinsic attributes specific to each individual part makes a successful counterfeit highly improbable. While it is difficult to copy a single intrinsic attribute, the chances of copying multiple intrinsic attributes is extremely small. Further, a successful counterfeiter would also need to match the unique attributes for each individual component, since the attributes are not the same across all parts of the same type. Thus, the product identifier coupled with an identifier intrinsic to the individual product itself makes for a reliable authentication mechanism that is exceptionally impractical to attempt to counterfeit.

Figure 4:
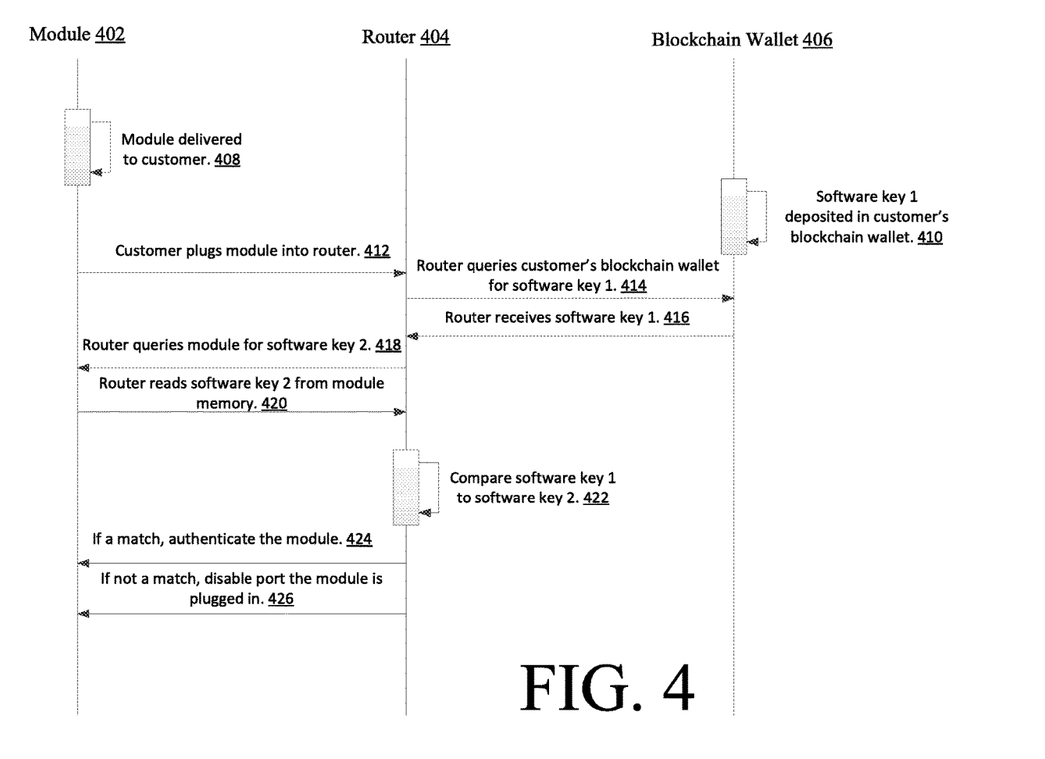
FIG. 4 shows a diagram of an example implementation of authenticating a product in accordance with some embodiments.

FIG. 4 shows a diagram of an example embodiment of a purchaser authenticating a product. In the shown embodiment, the product is a plug-in transceiver 402 designed to be inserted into router 404 (although it should be noted that the product can be any number of devices, such as any device that uses RFID and/or NFC, for example). Optical monitoring attributes are set up so that, at any given time, the power, for example, that is being sent by the transceiver and the power being received by the transceiver is known using built in measurement features.

When the casing is put on the transceiver, the trusted node has its own private key to log into the blockchain network.

The blockchain then transmits a particular bitstream to the transceiver. Data associated with the intrinsic attributes of transceiver 402 is measured, such as the power consumed (e.g., from measuring the current and voltage once the transceiver is plugged in), optical power, etc. With specific bit sequences, extinction ratios are calculated and measured, such as at a trusted node, along with the power consumed and are then sent and stored on blockchain wallet 406.

At some point, transceiver 402 is delivered to a customer (or other third party) (408). System 100 deposits the associated product identifier, software key 1, into the customer's blockchain wallet (410). When the customer plugs transceiver 402 into router 404 (412), router 404 queries the customer's blockchain wallet for software key 1 (414). Router 404 receives software key 1 (416), and then queries transceiver 402 for the product identifier stored locally on the device itself (e.g., software key 2) (418). In some embodiments, router 404 can receive software key 1 from the application on the mobile device or authentication service can receive software key 1 to prevent design arounds. Router 404 reads software key 2 from transceiver 402's memory (420).

Router 402 then compares software key 1 to software key 2 (422). If there is a match, transceiver 402 is authenticated as a genuine, non-counterfeited product (424) and, in some instances, router 402 activates the port that transceiver 402 is connected to. Conversely, if there is no match, router 402 disables the port that transceiver 402 is plugged into (426).

The attributes discussed above and that are connected to the transceiver's serial number in the blockchain allow for almost 100% confidence in detecting and illuminating counterfeit products. This is because the blockchain system is based on unique identifiers to the transceiver, such as the extinction ratio. Thus, a counterfeiter can copy the same hardware of the transceiver, but cannot copy the performance of the individual transceiver they are copying.

While throughout this description the technology has been described with respect to a transceiver, the principles of the present technology can be applied to any device having internal and external components. The present technology can still be utilized by any device having an internal part that can be interrogated to learn a unique identifier. In some embodiments the unique identifier is derived from intrinsic properties of the device. In some embodiments, the unique identifier(s) are assigned to the part. In some embodiments, an additional component will need to be added to the part in order to allow for the internal part to be interrogated—for example and radio frequency ID chip can be attached to or otherwise integrated into the external part to allow interrogation of the internal part to learn the unique identifier. The unique identifier of the internal part can be matched with an identifier of an external part to determine whether the product is authentic. In some embodiments, more than one internal part can be interrogated to determine its unique identifier.

Figure 5:
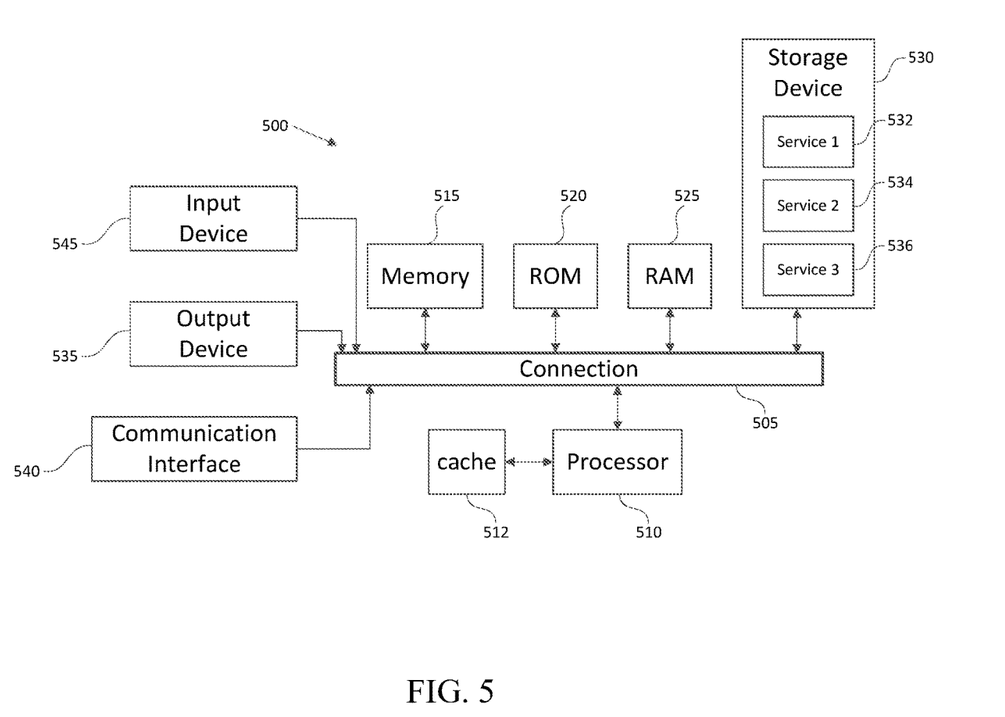
FIG. 5 shows an example of a system for implementing certain aspects of the present technology in accordance with some embodiments.

FIG. 5 shows an example of computing system 500 for use in components illustrated in FIGS. 1, 3, and 4, in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium comprising instructions, when executed by one or more computing systems, the instructions cause the one or more computing systems to:

receive an intrinsic attribute of an internal component of an electronic product at a first time, the intrinsic attribute being a unique attribute measured from the internal component, wherein the uniqueness of the attribute is derived from variances in physical properties between the internal component and other internal components;

receive a product identifier of an external component of the electronic product at a second time;

store the intrinsic attribute of the internal component and the product identifier of the external component at a blockchain comprising one or more nodes;

receive at least one identifier of the electronic product;

at a third time, subsequent the first time or second time, when the electronic product has electric conductivity, and for confirming the electronic product is authentic, in response to a determination of a match between the at least one identifier of the electronic product and the intrinsic attribute of the internal component and the product identifier of the external component stored in the blockchain, confirm the electronic product is authentic; and based on the electronic product being authentic, activating a port of a switch which the electronic product is connected.

2. The non-transitory computer-readable medium of claim 1, wherein the intrinsic attribute is based on a power operation of the internal component.

3. The non-transitory computer-readable medium of claim 1, comprising instructions to cause the one or more computing systems to send a communication that disables the electronic product when the determination is not a match.

4. The non-transitory computer-readable medium of claim 1, wherein the intrinsic attribute of the internal component is received from a network device, the network device being configured to measure the intrinsic attribute through optical monitoring of power consumption of the internal component when the electronic product is plugged into a port of the network device.

5. The non-transitory computer-readable medium of claim 4, wherein confirming the electronic product is authentic is automatically initiated once the electronic product is plugged into the port of the network device.

6. The non-transitory computer-readable medium of claim 4, wherein confirming the electronic product is authentic is initiated by receiving a request to authenticate through an application.

7. The non-transitory computer-readable medium of claim 1, wherein the external component is a casing and the product identifier is from a label on the casing.

8. The non-transitory computer-readable medium of claim 7, comprising instructions to cause the one or more computing systems to:

capture the intrinsic attribute while the electronic product lacks the casing at the first time and storing the intrinsic attribute in the blockchain at the first time;

capture the product identifier from the label at the second time before the label is disposed upon the internal component and storing the product identifier in the blockchain at the second time; and at the third time, comparing a first identifier of the at least one identifier of the electronic product to the intrinsic attribute stored in the blockchain, and comparing a second identifier of the at least one identifier of the electronic product to the product identifier stored in the blockchain.

9. The non-transitory computer-readable medium of claim 1, comprising instructions to cause the one or more computing systems to:

receive, from an application, a request to authenticate the electronic product;

receive, from the application configured to scan the label, the product identifier displayed on the label;

query a switch the electronic product is plugged into for the intrinsic attribute of the internal component;

after receiving the intrinsic attribute, query the blockchain and, based on the compared received intrinsic attribute and the intrinsic attribute stored in the blockchain being a match, verify that the electronic product is authentic.

10. A method of authenticating an electronic product comprising:

receiving, at a first time, an intrinsic attribute of an internal component of the electronic product, the intrinsic attribute being a unique attribute measured from the internal component, wherein the uniqueness of the attribute is derived from variances in physical properties between the internal component and other internal components;

receiving, at a second time, a product identifier of an external component of the electronic product;

storing the intrinsic attribute and the product identifier within a blockchain;

receiving, at a third time subsequent the first time or second time and when the electronic product has electric conductivity, a request to authenticate the electronic product, wherein the request includes at least one identifier of the electronic product;

in response to a determination of a match between the at least one identifier of the electronic product and the intrinsic attribute of the internal component and the product identifier of the external component stored in the blockchain, confirm the electronic product is authentic; and based on the electronic product being authentic, activating a port of a switch which the electronic product is connected.

11. The method of claim 10, wherein the product identifier is further based on a sequence of historical intrinsic attributes, the historical intrinsic attributes being entries in the blockchain prior to the intrinsic attributes.

12. The method of claim 10, wherein the intrinsic attribute is based on a power operation of the internal component.

13. The method of claim 10, wherein a port the electronic product is plugged into is activated after authentication.

14. The method of claim 10, wherein the product identifier is received from a label on the casing.

15. A system for authenticating an electronic product comprising:

a memory storing instructions, which when executed by a processor causes the processor to:

receive, at a first time, data associated with an intrinsic attribute of an internal component of the electronic product, the intrinsic attribute being a unique attribute measured from the internal component, wherein the uniqueness of the attribute is derived from variances in physical properties between the internal component and other internal components;

receive, at a second time, a product identifier of an external component of the electronic product;

store the intrinsic attribute and the product identifier within a blockchain comprising one or more nodes;

receive, at a third time subsequent the first time or second time and when the electronic product has electric conductivity, a request to authenticate the electronic product comprising at least one identifier of the electronic product; and in response to a determination of a match between the at least one identifier of the electronic product and the intrinsic attribute and the product identifier stored in the blockchain, confirm the electronic product is authenticated; and based on the electronic product being authentic, activating a port of a switch which the electronic product is connected.

16. The system of claim 15, wherein the product identifier is further based on a sequence of historical intrinsic attributes, the historical intrinsic attributes being entries in the blockchain prior to the intrinsic attribute.

17. The system of claim 15, wherein the internal component is separate from a casing such that a change in the casing modifies the intrinsic attribute.

18. The system of claim 15, wherein a port the electronic product is plugged in is activated after authentication.

19. The system of claim 15, wherein the product identifier is received from a label on a casing.

* * * * *